(12) United States Patent
Webb et al.

(10) Patent No.: US 7,175,422 B2
(45) Date of Patent: Feb. 13, 2007

(54) METHOD FOR ACCELERATED AGING OF CATALYTIC CONVERTERS INCORPORATING INJECTION OF VOLATILIZED LUBRICANT

(75) Inventors: Cynthia C. Webb, San Antonio, TX (US); Brent A. Shoffner, San Antonio, TX (US); Gordon J. Bartley, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 258 days.

(21) Appl. No.: 10/458,023

(22) Filed: Jun. 10, 2003

(65) Prior Publication Data

US 2004/0028588 A1    Feb. 12, 2004

Related U.S. Application Data

(63) Continuation-in-part of application No. 10/213,890, filed on Aug. 6, 2002.

(60) Provisional application No. 60/310,345, filed on Aug. 6, 2001.

(51) Int. Cl.
*F23M 9/00* (2006.01)

(52) U.S. Cl. .................. 431/2; 431/4; 431/7; 431/170; 73/118.1

(58) Field of Classification Search ................... 431/1, 431/9, 7, 170, 181, 187, 350, 4; 60/276, 60/280, 298, 303, 299; 73/118.1, 117.1, 73/865.6

See application file for complete search history.

(56) References Cited

U.S. PATENT DOCUMENTS 1,102,510 A    7/1914   Irish (Continued)

FOREIGN PATENT DOCUMENTS

DE    918699    7/1949

(Continued)

OTHER PUBLICATIONS

Ingalls—"Focus—A New Apparatus for Evaluating the effects of Poisoning on Catalyst Durability"; SAE Toptec (Oct. 14 & 15, 1998).*

(Continued)

*Primary Examiner*—Carl D. Price
(74) *Attorney, Agent, or Firm*—Baker Botts L.L.P.

(57) ABSTRACT

A method and apparatus for accelerated aging of an automotive catalytic converter under conditions incorporating volatilized oil consumption.

27 Claims, 3 Drawing Sheets

U.S. PATENT DOCUMENTS

| | | | |
|---|---|---|---|
| 3,030,773 A | 4/1962 | Johnson | |
| 3,131,749 A | 5/1964 | Davis | |
| 3,176,751 A | 4/1965 | Gerlitz | |
| 3,430,443 A * | 3/1969 | Parnell et al. | 60/738 |
| 3,503,715 A | 3/1970 | Haensel | |
| 3,630,024 A | 12/1971 | Hopkins | |
| 3,685,740 A | 8/1972 | Sheperd | |
| 3,694,135 A | 9/1972 | Dancy et al. | |
| 3,818,846 A | 6/1974 | Reese | |
| 3,890,088 A | 6/1975 | Ferri | |
| 3,906,718 A * | 9/1975 | Wood | 60/738 |
| 3,916,619 A * | 11/1975 | Masai et al. | 60/756 |
| 4,035,137 A | 7/1977 | Arand | |
| 4,054,418 A | 10/1977 | Miller et al. | |
| 4,118,171 A | 10/1978 | Flanagan et al. | |
| 4,270,896 A | 6/1981 | Polinski et al. | |
| 4,383,411 A | 5/1983 | Riddel | |
| 4,651,524 A | 3/1987 | Brighton | |
| 4,845,940 A | 7/1989 | Beer | |
| 4,878,380 A | 11/1989 | Goodman | |
| 5,085,577 A | 2/1992 | Muller | |
| 5,140,814 A | 8/1992 | Kreutmair et al. | |
| 5,149,261 A | 9/1992 | Suwa et al. | |
| 5,267,851 A | 12/1993 | Washam et al. | |
| 5,288,021 A | 2/1994 | Sood et al. | |
| 5,320,523 A | 6/1994 | Stark | |
| 5,339,630 A | 8/1994 | Pettit | |
| 5,396,794 A | 3/1995 | Nichols | |
| 5,493,171 A | 2/1996 | Wood, III et al. | |
| 5,529,048 A | 6/1996 | Kurihara et al. | |
| 5,553,450 A | 9/1996 | Schnaibel et al. | |
| 5,584,178 A | 12/1996 | Naegeli et al. | |
| 5,592,924 A | 1/1997 | Audisio | |
| 5,626,014 A | 5/1997 | Hepburn et al. | |
| 5,693,874 A | 12/1997 | De La Cruz et al. | |
| 5,713,336 A | 2/1998 | King | |
| 5,826,428 A | 10/1998 | Blaschke | |
| 5,860,277 A | 1/1999 | Schnaibel et al. | |
| 5,899,062 A | 5/1999 | Jerger et al. | |
| 5,974,787 A | 11/1999 | Lemire et al. | |
| 5,974,788 A | 11/1999 | Hepburn et al. | |
| 5,998,210 A | 12/1999 | Hepburn et al. | |
| 6,071,113 A | 6/2000 | Tsubouchi et al. | |
| 6,269,633 B1 | 8/2001 | Van Nieuwstadt | |
| 6,298,729 B1 | 10/2001 | Locker | |
| 6,301,875 B1 | 10/2001 | Backlund et al. | |
| 6,378,359 B1 | 4/2002 | Dobson et al. | |
| 6,382,182 B1 | 5/2002 | Green | |
| 6,490,858 B2 | 12/2002 | Barrett et al. | |
| 6,586,254 B1 | 7/2003 | Kumar | |
| 6,594,990 B2 | 7/2003 | Kuenstler | |
| 6,713,025 B1 | 3/2004 | Ivanescu | |
| 2001/0054281 A1 | 12/2001 | Adams et al. | |
| 2003/0012700 A1 | 1/2003 | Carnahan | |
| 2003/0079520 A1 | 5/2003 | Ingalls et al. | |
| 2004/0007056 A1 | 1/2004 | Webb et al. | |
| 2004/0025580 A1 | 2/2004 | Webb et al. | |
| 2004/0237636 A1 | 12/2004 | Bartley | |

FOREIGN PATENT DOCUMENTS

| | | |
|---|---|---|
| DE | 3020030 | 12/1981 |
| EP | 000895024 A2 | 2/1999 |
| EP | 000961013 A2 | 12/1999 |
| FR | 2674333 | 9/1992 |
| GB | 2329853 | 7/1999 |
| GB | 2356826 | 6/2001 |
| JP | 51-111927 | 10/1976 |
| JP | 56-49820 | 5/1981 |
| JP | 04-72410 | 3/1992 |
| JP | 06-264740 | 9/1994 |
| JP | 07-198127 | 8/1995 |
| JP | 11-159386 | 6/1999 |
| JP | 11-270808 | 10/1999 |

OTHER PUBLICATIONS

Jovanovic, Modified apparatus for the simulation of engine exhaust emissions, Goriva Maziva, 1984, pp. 33-38, vol. 23(1).

Southwest Research Institute, Unique SwRI-developed procedures and analytical tools to assist vehicle manufactures in meeting SULEV standards, Southwest Research Institute News, Feb. 23, 1998, Southwest Research Institute, San Antonio, Texas.

Casinhas et al., A Pyrolysis cell as simulator for an automobile catalytic converter, Vacuum, 1999, pp. 89-97, vol. 52, Elsevier Science Ltd.

Hepburn, A Comparison Between the Combustion of Isooctane, Methanol, and Methane in Pulse Flame Combustors with Closed Loop A/F Control, SAE Technical Paper 920799, 1992, SAE International.

United States Department of Energy, Taking an Alternative Route—Facts about CNG & LPG Conversion, http://pugetsoundcleancities.org/pdfs/cng_lpg_conversion_facts.pdf, Alternative Fuel Information, U.S. Department of Energy (date of publication unknown).

Webb et al., Development of a Methodology to Separate Thermal from Oil Aging of a Catalyst Using a Gasoline-Fueled Burner System, SAE Technical Paper 2003-01-0663, 2003, SAE International.

Webb et al., PC-Based Control of a Gasoline-Fueled Burner Aging Test Stand to Simulate Engine Exhaust, LabVIEW for Automotive, Telecommunications, Semiconductor, Biomedical, and other Applications, National Instruments Virtual Instrumentation Series, 2000, Prentice Hall.

Southwest Research Institute, Catalytic Converter Durability Testing, Southwest Research Institute-Department of Emissions Research, Promotional Brochure, San Antonio, TX.

Ingalls et al., Development of Catalyst Poisoning Evaluation Procedure, 08-9920, Internal Research & Development Program, Annual Report, 1996, p. 53, Southwest Research Institute, San Antonio, Texas.

Ingalls et al., Develop and Test an Apparatus to Evaluate Fuel and Lube Oil Effects on Automotive Catalysts, 08-9949, Internal Research & Development Program, Annual Report, 1996, pp. 53-54, Southwest Research Institute, San Antonio, Texas.

Southwest Research Institute, Further Advances in Exhaust Aftertreatment, Promotional Brochure, Feb. 1994, San Antonio, TX.

Otto et al., A Laboratory Method for the Simulation of Automobile Exhaust and Studies of Catalyst Poisoning, Journal of the Air Pollution Control Association, Jun. 1974, vol. 24, No. 6.

Selby, Development and Significance of the Phosphorus Emission Index of Engine Oils, 13th International Colloquium Tribology—Lubricants, Materials, and Lubrication, 2002, pp. 1-9.

Webb et al., Catalyst Aging Evaluation with Exposure to 0.06 and 0.11 Percent Phosphorus Oils Using the FOCUS Burner System, JSAE 20030269, 2003, SAE 2003-01-1999, Society of Automotive Engineers, Inc.

Drury et al., The Effect of Lubricant Phosphorus Level on Exhaust Emissions in a Field Trial of Gasoline Engine Vehicles, SAE Technical Paper 940745, 1994, SAE International.

Ueda et al., Engine Oil Additive Effects on Deactivation of Monolithic Three-Way Catalysts and Oxygen Sensors, SAE Technical Paper 940746, 1994, SAE International.

Williamson, Catalyst Deactivation Due to Glaze Formation From Oil-Derived Phosphorus and Zinc, SAE Technical Paper 841406, 1984, SAE International.

Joy et al., Influence of Phosphorus on Three-Component Control Catalysts: Catalyst Durability and Characterization Studies, SAE Technical Paper 852099, 1985, SAE International.

Cully et al., The Impact of Passenger Car Motor Oil Phosphorus Levels on Engine Durability, Oil Degradation, and Exhaust Emission in a Field Trial, SAE Technical Paper 952344, 1995, SAE International.

Cully et al., The Impact of Passenger Car Motor Oil Phosphorus Levels on Automotive Emissions Control Systems, SAE Technical Paper 961898, 1996, SAE International.

Ball et al., Application of Accelerated Rapid Aging Test (RAT) Schedules with Poisons: The Effects of Oil Derived Poisons, Thermal Degradation, and Catalyst Volume on FTP Emissions, SAE Technical Paper 972846, 1997, SAE International.

Beck et al., Impact of Sulfur on the Performance of Vehicle-Aged Palladium Monoliths, Applied Catalysis B: Environmental 6, 1995, vol. 185-200.

Jobson et al, Spatially Resolved Effects of Deactivation on Field-Aged Automotive Catalysts, SAE Technical Paper 910173, 1991, SAE International.

Minutes—Oil Protection of Emission System Test II Task Force Held on Aug. 19, 1999, ASTM, Sep. 27, 1999. (Redacted).

Minutes—Oil Protection of Emission System Test II Task Force Held on May 23, 2000, ASTM, Jun. 8, 2000. (Redacted).

Minutes—Oil Protection of Emission System Test (OPEST) II Task Force Held Apr. 4, 2001, ASTM, May 2, 2001, San Antonio, TX. (Redacted).

Proceedings of the Eight CRC On-Road Vehicle Emissions Workshop, vol. 2, Apr. 20-22, 1998 ("CRC Proceedings").

SAE Presents Automotive Systems Testing Toptec Oct. 14-15, 1998, Novi, Michigan ("SAE Presentation").

Feb. 1999 marketing brochure of Southwest Research Institute entitled "Fuel/Oil Catalyst Aging System" (FOCAS).

* cited by examiner

METHOD FOR ACCELERATED AGING OF CATALYTIC CONVERTERS INCORPORATING INJECTION OF VOLATILIZED LUBRICANT

PRIORITY DATE

The present application is a continuation-in-part of U.S. patent application Ser. No. 10/213,890 filed Aug. 6, 2002, incorporated herein by reference, which claims priority to U.S. Provisional Application Ser. No. 60/310,345 filed Aug. 6, 2001.

FIELD OF THE INVENTION

The present application relates in general to an apparatus, and to a method of using an apparatus to simulate the consumption of the volatile components of oil by an engine. The apparatus can be engine based, but preferably is an non-engine based exhaust component rapid aging system (NEBECRAS).

BACKGROUND

An automotive catalytic converter is an emissions control device that may be incorporated into the exhaust system of a motor vehicle between the exhaust manifold and the muffler. The catalytic converter contains one or more catalysts, such as those based on platinum, palladium, or rhodium, that reduce the levels of hydrocarbons (HC), carbon monoxide (CO) and nitrogen oxides (NOx) in the exhaust gas, thereby reducing the amount of these pollutants which would otherwise be emitted into the atmosphere from the vehicle. In a typical commercial catalytic converter, HC and CO in the exhaust are oxidized to form carbon dioxide (CO2) and water, and NOx are reduced to nitrogen (N2).

As a result of recent regulatory initiatives, motor vehicle emissions control devices, including catalytic converters, are now required to have longer useful lives. US regulatory authorities such as the US Environmental Protection Agency (EPA) and the California Air Resources Board (CARB) now require automotive emission control elements to function up to 150,000 vehicle miles. This requirement, coupled with tighter emission standards, places severe demands on catalytic converters and other exhaust emissions control devices. Catalytic converters lose efficiency primarily by two mechanisms. High exhaust temperatures can cause thermal damage, and a number of components introduced into the typical automotive internal combustion engine exhaust, e.g. from the lubricating oil, can act as poisons to the catalyst present in the converter.

In order to accommodate these stringent EPA requirements, it is important to develop methods for accelerated aging that adequately simulate the impact of various engine operating modes, and various oil components. A method is needed to simulate the consumption of the volatile components of oil in order to adequately and efficiently assess the impact of such consumption on the aging of a catalytic converter.

SUMMARY OF THE INVENTION

A non-engine based exhaust component rapid aging system (NEBECRAS) comprising a combustor in fluid communication with an air supplier, a fuel supplier, a volatilized oil supplier, and a catalytic converter, said combustor being adapted to provide substantially continuous and effective stoichiometric combustion of a feedstream to produce an exhaust product.

BRIEF DESCRIPTION

Figure 1:
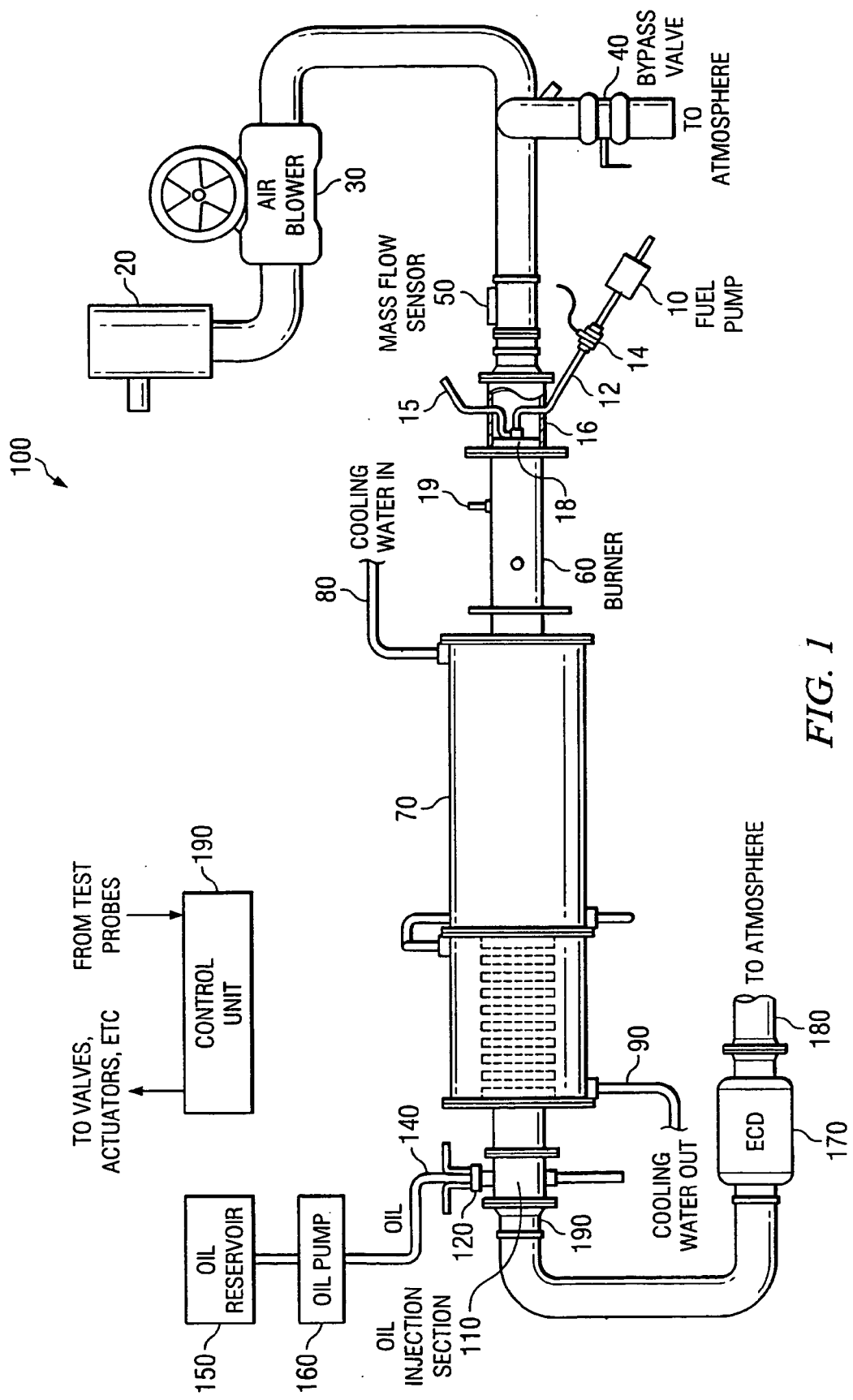
FIG. 1 shows a schematic diagram of one embodiment of the FOCAS® system.

The present application provides an apparatus and a method for simulating the impact of volatile oil components on a catalytic converter. The apparatus can be an engine based apparatus or a non-engine based apparatus. In a preferred embodiment, the apparatus is a non-engine based exhaust component rapid aging system (NEBECRAS), most preferably a FOCAS® rig.

As used herein, the term "catalytic converter" means a full scale emissions control device suitable for incorporation into the exhaust system of a motor vehicle between the exhaust manifold and the muffler. "Extended driving conditions" refers to the equivalent of at least about 50,000 vehicle miles, preferably up to 100,000 vehicle miles, more preferably up to 150,000 vehicle miles.

A preferred NEBECRAS for use in the method is the "FOCAS® rig," described in U.S. Patent Application Publication No. 20030079520, application Ser. No. 10/213,890 published May 1, 2003, incorporated herein by reference. Briefly, the FOCAS® rig comprises: (1) an air supply system (20, 30, 40) to provide air for combustion to the burner, (2) a fuel system (10, 12, 14) to provide fuel to the burner, (3) a burner system (60) to combust the air and fuel mixture and to provide the proper exhaust gas constituents, (4) a heat exchanger (70) to control the exhaust gas temperature, (5) an oil injection system (110), and (6) a computerized control system (190). The foregoing components are described in detail in U.S. Patent Application Publication No. 20030079520.

The FOCAS® rig was developed to evaluate the long term effects of the individual variables on the long term performance of the catalyst. The FOCAS® rig is capable of producing a simulated exhaust gas with a composition and temperature corresponding to that produced by the internal combustion engine of a motor vehicle. The burner system in the FOCAS® rig comprises a nozzle and swirl plate (18) which is effective even at a stoichiometric air to fuel ratio (AFR) of producing a feedstream flowpath comprising an air shroud effective to prevent flame from attaching to the nozzle during combustion of the fuel. The swirl plate (18) is effective to substantially continuously and effectively stoichiometrically combust the feedstream while preventing the flame from remaining in constant contact with an inner wall of the combuster tube.

In the present application, a volatilization subsystem is integrated into the oil injection system of the NEBECRAS, preferably into a FOCAS® rig, to simulate the consumption of the volatile components of oil, and the system thereafter evaluates the impact of the consumption of these volatile components of oil on the aging of the catalytic converter.

Although the FOCAS® rig is preferred, it will be apparent to persons of ordinary skill in the art that any functional and effective NEBECRAS could be adapted for use in accordance with the principles described herein, and that an engine based rig also could be altered to incorporate the volatilization sub-system described herein.

The Oil Injection System

Figure 2:
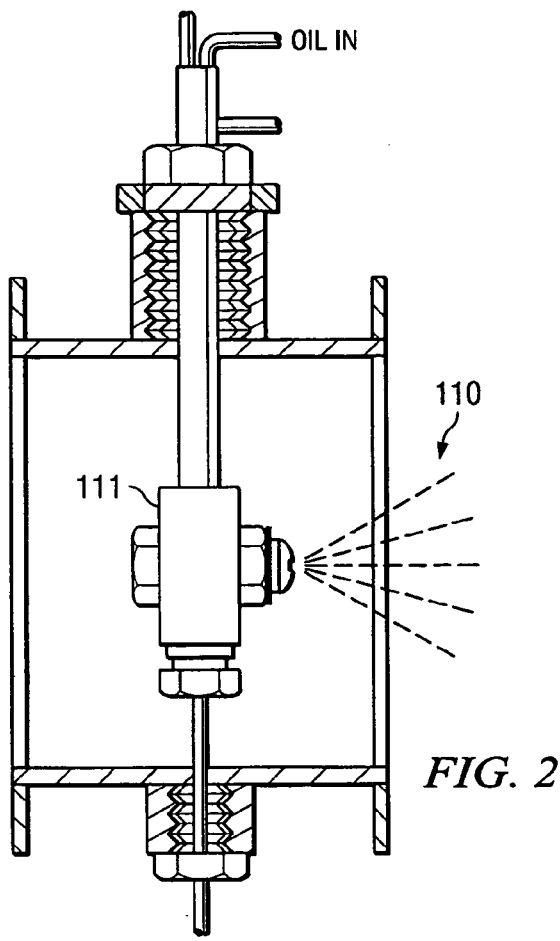
FIG. 2 is a schematic of the existing bulk oil injection subsystem in the FOCAS® rig.

In a preferred embodiment, the method and apparatus take advantage of the oil injection system (110) which is part of the FOCAS® rig. The current oil injection system (110 in FIGS. 1 and 2) uses pressurized nitrogen to atomize the bulk oil consumption for injection through the oil injection nozzle 111. In the present application, the pressurized nitrogen system, including the oil injection nozzle 110, is used to add volatilized fractions P from the oil.

Figure 3:
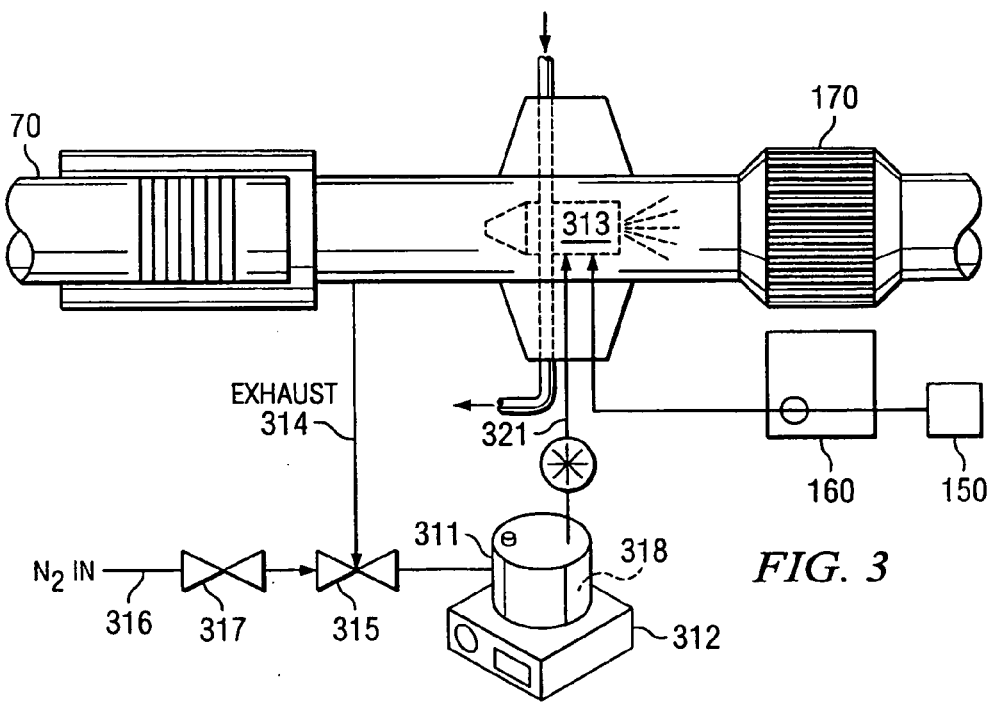
FIG. 3 is a schematic of the proposed volatilization subsystem integrated into the FOCAS® rig.

A schematic of the proposed volatilization sub-system integrated into the current system is shown in FIG. 3, and includes oil injection nozzle 313. The sub-system includes a volatile reservoir 311 preferably comprising a temperature control unit 312. Exhaust gas is pulled from the FOCAS® rig, preferably at a point downstream from the heat exchanger and upstream from the oil injector 111. Exhaust gas is carried through first tubing 314 to an eductor 315. Nitrogen is carried through second tubing 316 preferably via a pressure regulator 317 to the eductor 315. The combined exhaust gas and nitrogen are bubbled through the oil in the reservoir 311 via a gas injection probe 318, shown in more detail in FIG. 4.

Figure 4:
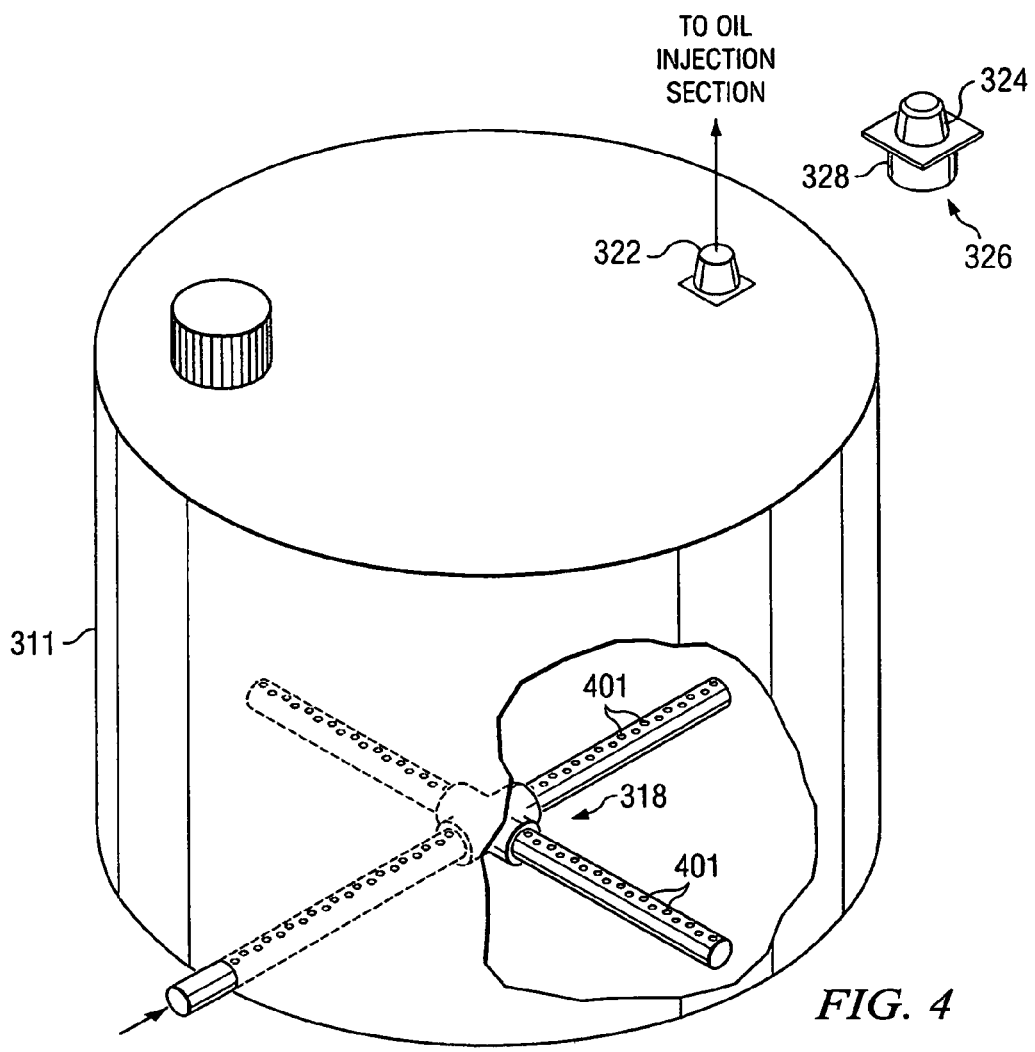
FIG. 4 is a schematic of the volatile reservoir for volatile oil injection.

Referring to FIG. 4, a preferred gas injection probe 318 is ⅛ inch stainless steel tubing comprising an inlet probe which branches to form three probe arms. The probe arms preferably are welded shut at their terminal ends.

Probe 318 has openings 401 through which the combined nitrogen/exhaust gas stream is released into the oil. The openings 401 preferably are random, and the inlet probe preferably comprises fewer openings than any of the probe arms. In a most preferred embodiment, the inlet probe has about ¼ the number of openings as the number of openings in the probe arms. Referring again to FIG. 3, a pressure regulator 317 maintains the nitrogen at a pressure of from about 5 to about 40 psi in order to ensure sufficient volatilization of the oil and sufficient atomization in the bulk injector.

The reservoir 311 preferably comprises a sealable opening, such as a threaded seal cap, preferably about a 1½ inch fill cap which is maintained closed during use. The combination of nitrogen and volatilized oil flows through the volatilized oil injection tubing 321 to the oil injection nozzle 111. In a preferred embodiment, the oil injection tubing 321 is engaged with an outlet 322 comprising an outlet tap 324 protected on the reservoir side by a cover 326.

As seen in FIG. 4, the cover 326 comprises a splash shield 328. The splash shield 328 projects inward from the surface of the reservoir for a distance effective to allow $N_2$ and volatilized components to be pushed out while preventing bulk oil consumption from the reservoir. Preferably, the splash shield projects inward about ½ inch.

In order to maintain a correct balance of bulk-P consumption to volatile-P consumption, the volatile-consumption (V-C) factor for the OPEST II test approach, and the real phosphorus depletion curve are determined. In order to determine these values, the system is run for a period of time and the phosphorus content of the oil is analyzed. Because removing samples from the plenum will modify the overall volume of oil, which also should modify the volatile-phosphorus (P) consumption rate, several tests are run for a varying number of hours. A fresh oil charge is made at the beginning of each test. Preferably, tests are run to the following number of hours: 1, 2, 3, 4, 6, 8, 10, 15, and 20. For each test point, the phosphorus content of the oil is measured. The data provides information on volatile consumption and phosphorus depletion, and provides the data to determine the real V-C factor and the P-depletion curve. Using this information, the procedure can be adjusted, and an oil change schedule can be created.

Creating the Oil Change Schedule

Assuming that about 60 percent of the phosphorus (P)-consumption in an engine under normal operating conditions is volatile P-consumption, the mass of volatile-P that should be consumed during a 200 hour OPESTII aging procedure (on 0.011P oil) will be related to the mass of P consumed by bulk consumption. The mass of P consumed by bulk oil consumption during a 200-hour aging procedure where 6 quarts of oil are consumed is:

$$6 \text{ Qts. Oil} \times 820 \text{ g/Qt.} \times 0.0011 = 5.4 \text{ g Bulk-P}$$

Based on this bulk consumption, the volatile consumption could be:

$$P_{Bulk} \times 5.4 \times \left(\frac{0.6}{0.4}\right) + 8.1 \text{ g Volatile} - P$$

During the OPEST II test, the FOCAS® rig consumes 30 grams of bulk oil per hour. This produces a Bulk-P consumption rate of:

$$30 \frac{g}{hr} \times 0.0011 \times 1000 \frac{mg}{g} = 33 \frac{mg}{hr} \text{ Bulk} - P$$

If we would like 60 percent of the total P-consumption to be Volatile-P, then based on the FOCAS® bulk oil consumption, we need:

$$33 \frac{mg}{hr} \times \left(\frac{0.6}{0.4}\right) = 49.5 \frac{mg}{hr} \text{ Volatile} - P$$

Based on the published Selby-Nock test, the volatiles-collecting bench procedure runs the following conditions:

250° F. (to simulate the upper ring-belt temperature)

60 minutes 65 g oil a slight vacuum (to induce air flow across sample)

Selby, T., "Development and Significance of the Phosphorus Emission Index of Engine Oils,"13th International Colloquium Tribology—Lubricants, Materials, and Lubrication Technische Akademie Esslingen, Stuttgart/Ostfildern, Germany. Jan. 15–17, 2002.

The Selby-Noak test produces a range of mass of volatile-Phosphorus emission, but the average is about 2 mg. If we assume the value of 2 mg/hour to be a reasonable emission rate for that mass of oil, at the given temperature in one hour, then we can calculate the conditions we need for the OPEST II test.

The Selby-Noak test uses 65 grams of oil and produces about 2 mg of volatile P in one hour. This gives us a scaling factor, let's call it the volatile consumption factor (V-C factor) of:

$$\frac{2 \text{ mg Volatile} - P}{65 \text{ g Oil} - \text{hr}}$$

If we assume volatility is linear (i.e., more oil produces more volatile P, in proportion to the V-C factor), then the volatilization container would need to hold about 2 quarts of oil. The real V-C factor will set the volume of the volatile reservoir.

$$49.5 \frac{\text{mg}}{\text{hr}} \times \frac{65 \text{ g}}{2 \text{ mg}} \times \frac{1 \text{ Qt.}}{820 \text{ g}} = 1.96 \text{ Qts.}$$

Figure 5:
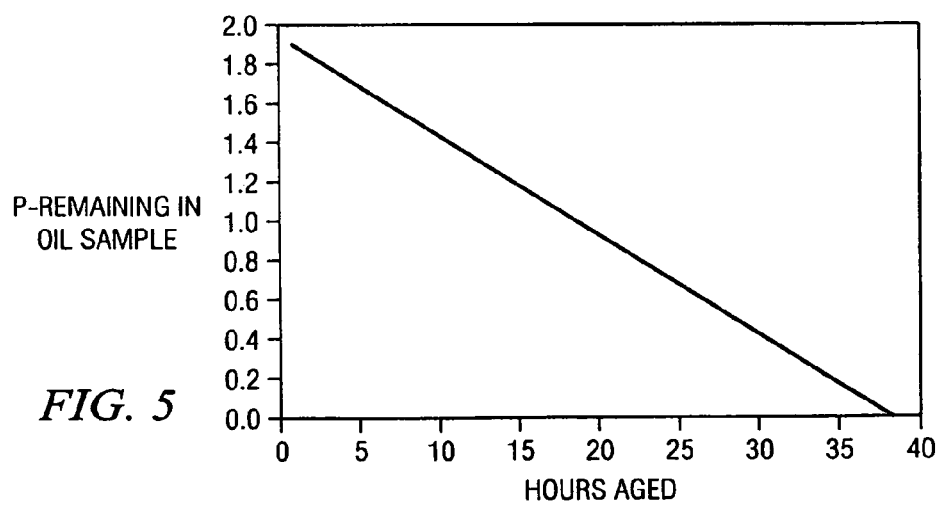
FIG. 5 depicts a linear calculation of phosphorus depletion with the given V-C factor.

At this Volatile-P rate, assuming that the P-depletion is linear (which it probably is not), the Phosphorus from a two quart sample would be depleted in about 40 hours. See FIG. 5 for a linear calculation of the depletion. This relation will set the change interval for the oil in the volatile reservoir.

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A burner-based system for generating exhaust gas that simulates exhaust gas from an internal combustion engine, comprising:
   a combustor in fluid communication with an air supplier,
   a fuel supplier for delivering fuel to the combustor,
   wherein the combustor combusts air and the fuel to generate a flow of exhaust gas into a main exhaust flow line;
   a volatilized lubricant supplier for delivering a flow of volatilized lubricant into the main exhaust flow line downstream the combustor;
   wherein the volatized lubricant supplier comprises: an exhaust gas pull line connected to and in fluid communication with the main exhaust line for diverting a portion of exhaust gas from the main exhaust line; a pressurized gas input line in fluid communication with the exhaust gas pull line for forming a mixture of exhaust gas and pressurized gas; a reservoir configured for storing a volume of the lubricant; a probe within the reservoir, said probe configured for receiving and for injecting said mixture of exhaust gas and pressurized gas into lubricant within the reservoir thereby volatilizing the stored lubricant; a first end of a volatilized lubricant delivery line connected to and in fluid communication with volatilized lubricant within the reservoir; and a nozzle connected to and in fluid communication between said volatilized lubricant delivery line and an interior of the main exhaust line for delivering the volatilized lubricant into the main exhaust line at a point downstream the exhaust gas pull line.

2. The system of claim 1, wherein said reservoir comprises a temperature control unit effective together with said pressurized gas and said exhaust to volatilize an amount of said lubricant.

3. The system of claim 1, wherein said probe comprises tubing having openings therethrough.

4. The system of claim 1, wherein said probe comprises an inlet probe in fluid communication with a plurality of probe arms.

5. The system of claim 1, wherein said reservoir comprises an exit port engaged with said volatilized lubricant delivery line, said exit port being adapted to prevent droplets of bulk oil from entering said volatilized lubricant delivery line.

6. A method for simulating aging of an emissions control device in the exhaust system of an internal combustion engine, comprising:
   combusting a supply of air and fuel with a burner, thereby providing a flow of exhaust gas into a main exhaust flow line;
   diverting a portion of the exhaust gas from the main exhaust flow line into a lubricant reservoir;
   pressurizing the portion of exhaust gas;
   using the pressurized exhaust gas to volatilize lubricant in the reservoir; and
   delivering volatilized lubricant back to the main exhaust line; and
   exposing the emissions control device to the volatilized lubricant.

7. The method of claim 6, wherein the pressurizing step is performed by adding pressurized gas to the portion of exhaust gas.

8. The method of claim 6, further comprising heating the lubricant in the reservoir.

9. The method of claim 6, wherein the lubricant is volatilized by means of a probe within the reservoir, the probe having openings for emitting the mixture into the reservoir.

10. The method of claim 6, further comprising delivering a supply of bulk lubricant into the main exhaust line.

11. The method of claim 10, wherein the volatilized lubricant and bulk lubricant are delivered as a mixture.

12. The method of claim 10, wherein the volatilized lubricant and bulk lubricant are delivered via a common nozzle.

13. The method of claim 10, wherein the volatilized lubricant and bulk lubricant are delivered at a predetermined ratio to each other.

14. The method of claim 10, wherein the ratio is determined by a desired ratio of volatilized phosphorus to bulk phosphorus.

15. The system of claim 1, further comprising a bulk lubricant delivery line, and a nozzle for receiving bulk lubricant via the bulk lubricant delivery line and for spraying the bulk lubricant into the main exhaust line.

16. The system of claim 1, wherein the nozzle is the same nozzle as used for the volatilized lubricant supplier.

17. A method for simulating the exhaust gas generated by an internal combustion engine, comprising:
   combusting a supply of air and fuel with a burner, thereby providing a flow of exhaust gas into a main exhaust flow line;
   diverting a portion of the exhaust gas from the main exhaust flow line into a lubricant reservoir;
   pressurizing the portion of exhaust gas;
   using the pressurized exhaust gas to volatilize lubricant in the reservoir; and
   delivering volatilized lubricant back to the main exhaust line.

18. The method of claim 17, wherein the pressurizing step is performed by adding pressurized gas to the portion of exhaust gas.

19. The method of claim 17, further comprising heating the lubricant in the reservoir.

20. The method of claim 17, wherein the lubricant is volatilized by means of a probe within the reservoir, the probe having openings for emitting the mixture into the reservoir.

21. The method of claim 17, further comprising delivering a supply of bulk lubricant into the main exhaust line.

22. The method of claim 21, wherein the volatilized lubricant and bulk lubricant are delivered as a mixture.

23. The method of claim 21, wherein the volatilized lubricant and bulk lubricant are delivered via a common nozzle.

24. The method of claim 21, wherein the volatilized lubricant and bulk lubricant are delivered at a predetermined ratio to each other.

25. The method of claim 21, wherein the ratio is determined by a desired ratio of volatilized phosphorus to bulk phosphorus.

26. A burner-based system for generating exhaust gas that simulates exhaust gas from an internal combustion engine, comprising:

a combustor in fluid communication with an air supplier, a fuel supplier for delivering fuel to the combustor, wherein the combustor combusts air and the fuel to generate a flow of exhaust gas into a main exhaust flow line;

a volatilized lubricant supplier for delivering a flow of volatilized lubricant into the main exhaust flow line downstream the combustor;

wherein the volatized lubricant supplier comprises: an exhaust gas pull line connected to and in fluid communication with the main exhaust line for diverting a portion of exhaust gas from the main exhaust line; means connected to and in fluid communication with said exhaust gas pull line for pressurizing the portion of exhaust gas; a reservoir configured for storing a volume of the lubricant and for receiving the portion of pressurized exhaust gas; a probe within the reservoir configured for using the pressurized exhaust gas to volatilize the stored lubricant; a first end of a volatilized lubricant delivery line connected to and in fluid communication with volatilized lubricant within the reservoir; and a nozzle connected to and in fluid communication between said volatilized lubricant delivery line and an interior of the main exhaust line for delivering the volatilized lubricant into the main exhaust line at a point downstream the exhaust gas pull line.

27. The system of claim 26, wherein the means for pressurizing the exhaust gas is an auxiliary input line for delivering a pressurized gas to the exhaust gas pull line.

* * * * *